(12) United States Patent
Mi et al.

(10) Patent No.: US 12,335,669 B2
(45) Date of Patent: Jun. 17, 2025

(54) OPTICAL MODULE, DATA CENTER SYSTEM, AND DATA TRANSMISSION METHOD

(71) Applicant: Huawei Technologies Co., Ltd., Guangdong (CN)

(72) Inventors: Guangcan Mi, Shenzhen (CN); Ruiqiang Ji, Dongguan (CN); Zeshan Chang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 232 days.

(21) Appl. No.: 17/941,269

(22) Filed: Sep. 9, 2022

(65) Prior Publication Data

US 2023/0007370 A1 Jan. 5, 2023

Related U.S. Application Data

(63) Continuation of application No. PCT/CN2021/078979, filed on Mar. 4, 2021.

(30) Foreign Application Priority Data

Mar. 12, 2020 (CN) .......................... 202010170323.0

(51) Int. Cl.
*H04B 10/07* (2013.01)
*H04B 10/2513* (2013.01)
(Continued)

(52) U.S. Cl.
CPC ... *H04Q 11/0067* (2013.01); *H04B 10/25133* (2013.01); *H04J 14/0282* (2013.01)

(58) Field of Classification Search
CPC ....... H04Q 11/0067; H04Q 2011/0035; H04Q 2011/0049; H04Q 2011/005;
(Continued)

(56) References Cited

U.S. PATENT DOCUMENTS 6,317,233 B1\* 11/2001 Son ..................... H04B 10/2941
385/140
8,428,456 B2\* 4/2013 Zheng ................. H04J 14/0287
398/5

(Continued)

FOREIGN PATENT DOCUMENTS

CN 101043758 A 9/2007
CN 101800599 A 8/2010
(Continued)

*Primary Examiner* — Tanya T Motsinger
(74) *Attorney, Agent, or Firm* — WOMBLE BOND DICKINSON (US) LLP

(57) ABSTRACT

An optical module is disclosed. The optical module includes a first downlink port, a second downlink port, a directional coupler, a optical attenuator, a first photodiode (PD), and a second PD. The directional coupler, connected to the first downlink port, is configured to receive a downlink optical signal. The second PD connected to the directional coupler, is configured to obtain a power value. If the power value is greater than a first threshold, the optical attenuator is configured to receive a attenuation control signal, and attenuate, based on the attenuation control signal, a power of an optical signal passing through the second downlink port. The first PD is configured to: convert the downlink optical signal into a downlink electrical signal, and convert the optical signal passing through the second downlink port into an electrical signal. Both the first downlink port and the second downlink port are connected to the first PD.

20 Claims, 8 Drawing Sheets

(51) Int. Cl.
*H04J 14/02* (2006.01)
*H04Q 11/00* (2006.01)

(58) Field of Classification Search
CPC .......... H04Q 11/0005; H04B 10/25133; H04B 10/032; H04B 10/40; H04B 10/516; H04B 10/572; H04J 14/0282; H04J 14/0202
See application file for complete search history.

(56) References Cited

U.S. PATENT DOCUMENTS

| | | | | |
|---|---|---|---|---|
| 2002/0109879 | A1* | 8/2002 | Wing So | H04Q 11/0005 398/58 |
| 2005/0123305 | A1* | 6/2005 | Kawasumi | H04B 10/25133 398/147 |
| 2008/0193124 | A1* | 8/2008 | Atieh | H04J 14/0221 398/3 |
| 2011/0038632 | A1 | 2/2011 | Zou | |
| 2015/0132015 | A1* | 5/2015 | Hayakawa | G02B 6/28 385/2 |
| 2016/0134360 | A1* | 5/2016 | Tokura | H04J 14/0227 398/5 |
| 2017/0126317 | A1* | 5/2017 | Jung | H04B 10/40 |
| 2018/0139519 | A1 | 5/2018 | Yoo et al. | |
| 2019/0165858 | A1* | 5/2019 | Cho | H04B 10/29 |
| 2020/0371295 | A1* | 11/2020 | Jones | H04L 49/357 |
| 2020/0374025 | A1* | 11/2020 | Jones | H04J 14/029 |
| 2021/0058152 | A1* | 2/2021 | Yutani | G02B 6/4261 |
| 2022/0224410 | A1* | 7/2022 | Annavajjala | H04L 45/22 |
| 2022/0329316 | A1* | 10/2022 | Yan | H04B 10/07955 |

FOREIGN PATENT DOCUMENTS

| | | |
|---|---|---|
| CN | 103460628 A | 12/2013 |
| CN | 109716685 A | 5/2019 |
| EP | 2713270 A1 | 4/2014 |
| JP | 2012249170 A | 12/2012 |

* cited by examiner

OPTICAL MODULE, DATA CENTER SYSTEM, AND DATA TRANSMISSION METHOD

CROSS-REFERENCE TO RELATED APPLICATIONS

This application is a continuation of International Application No. PCT/CN2021/078979, filed on Mar. 4, 2021, which claims priority to Chinese Patent Application No. 202010170323.0, filed on Mar. 12, 2020. The disclosures of the aforementioned applications are hereby incorporated by reference in their entireties.

TECHNICAL FIELD

Embodiments of this application relate to the field of optical network communication, and in particular, to an optical module, a data center system, and a data transmission method.

BACKGROUND

Advantages of a data center network (DCN) in electronic office, cloud storage of data, cloud processing of data, and other aspects make the data center network increasingly popular in various industries. With vigorous development of the data center network, data streams of the data center network also continuously increase, and a switching device needs to be connected to an increasing quantity of switching devices. Because switching devices are connected through optical modules, a quantity of optical ports 111 of an optical module also increases. The optical port 111 is an optical signal port through which an optical module on a switching device is connected to another switching device. An electrical port 112 is an electrical signal port through which an optical module on a switching device is connected to the switching device. As shown in FIG. 1, a data center network in the figure includes a core layer, a convergence layer, and an access layer, and a switching device 110 belongs to the convergence layer. A first device is used as an example. The first device has four electrical signals that are connected to an optical module A1 through four electrical ports 112. The optical module A1 is connected to switching devices 102 to 105 at the convergence layer through four optical ports 111 respectively. The first device further has four electrical signals that are connected to an optical module A2 through four electrical ports 112, and the optical module A2 is connected to the switching device 110 through an optical port 111.

An increase in a quantity of optical ports 111 can improve connectivity of the first device. To be specific, the first device can be connected to more switching devices, or connected to one switching device through more optical ports 111. Usually, a quantity of electrical ports 112 of the first device is limited, and a quantity of optical ports 111 is also limited by a quantity of electrical ports 112 of the optical module. Therefore, how to increase the quantity of optical ports 111 when the quantity of electrical ports 112 of the first device is limited is an issue that urgently needs to be addressed.

SUMMARY

This application provides an optical module, a data center system, and a data transmission method that are applied to the field of optical network communication, to improve connectivity of an optical module and reduce costs of the optical module.

A first aspect of this application provides an optical module, including a first downlink port, a second downlink port, a first directional coupler, a first optical attenuator, a first photodiode (PD), and a second PD. The first directional coupler is connected to the first downlink port, a first downlink optical signal passing through the first downlink port passes through the first directional coupler, and the first directional coupler includes two output ports. One output port transmits the first downlink optical signal to the first PD. The first PD is configured to convert the first downlink optical signal into a first downlink electrical signal. The other output port transmits, to the second PD, an optical signal obtained through coupling from the first downlink optical signal. The second PD detects a power of the optical signal obtained through coupling, to obtain a first power value. The first optical attenuator is connected to the second downlink port, and an optical signal passing through the second downlink port passes through the first optical attenuator. If the first power value is greater than a first threshold, the first optical attenuator may receive a first attenuation control signal, and attenuate, based on the first attenuation control signal, a power of the optical signal passing through the second downlink port. The first PD is further connected to the second downlink port. If the first power value is less than or equal to the first threshold and the first optical attenuator does not block the optical signal passing through the second downlink port, the first PD may further receive the optical signal passing through the second downlink port, and convert the optical signal into an electrical signal.

Two ports share one PD, so that connectivity of the optical module can be improved in this embodiment of this application. In addition, a structural design of the optical module is simple, thereby reducing costs of the optical module.

In one embodiment, the optical module further includes a first controller. The first controller is connected to the second PD, and is configured to receive the first power value sent by the second PD. If the first power value is greater than the first threshold, the first controller may generate the first attenuation control signal, and send the first attenuation control signal to the first optical attenuator.

In one embodiment, the optical module further includes a beam combiner. An input terminal of the beam combiner is connected to the first directional coupler and the first optical attenuator. An output terminal of the beam combiner is connected to the first PD. The first downlink optical signal passes through the beam combiner, and the beam combiner transmits the first downlink optical signal to the first PD; or the optical signal passing through the second downlink port passes through the beam combiner, and the beam combiner transmits, to the first PD, the optical signal passing through the second downlink port. The first PD may have only one input port.

In one embodiment, the first controller is further configured to obtain an attenuation stop signal, where the attenuation stop signal is obtained based on a transmission status of the first downlink electrical signal, and the transmission status is that transmission has stopped. The first controller is further configured to send the attenuation stop signal to the first optical attenuator. The first optical attenuator is further configured to stop, based on the attenuation stop signal, attenuating the power of the optical signal passing through the second downlink port. When no optical signal is transmitted on the first downlink port, the following problem can be avoided: The optical signal on the second downlink port is attenuated. As a result, the optical signal on the second downlink port cannot be transmitted, causing a waste of transmission resources.

In one embodiment, the second PD is further configured to obtain a second power value, and send the second power value to the first controller. If the second power value is less than or equal to a second threshold, the first controller is further configured to send an attenuation stop signal to the first optical attenuator. The first optical attenuator is further configured to receive the attenuation stop signal, and stop, based on the attenuation stop signal, attenuating a power of a second optical signal. If the second power value is less than or equal to the second threshold, transmission of data of the first downlink optical signal has been completed, or transmission has stopped, and the first controller may generate the attenuation stop signal, and send the attenuation stop signal to the first optical attenuator. This avoids the following problem: When no optical signal is transmitted on the first downlink port, the optical signal on the second downlink port is still attenuated. As a result, the optical signal on the second downlink port cannot be transmitted, causing a waste of transmission resources.

In one embodiment, the optical module further includes a second directional coupler, a second optical attenuator, and a third PD. An input terminal of the second directional coupler is connected to the first optical attenuator, an optical signal passing through the first optical attenuator passes through the second directional coupler, and the second directional coupler includes two output ports. One output port transmits, to the first PD, the optical signal passing through the second downlink port. The other output port transmits, to the third PD, an optical signal obtained through coupling from the optical signal passing through the second downlink port. The third PD detects a power of the optical signal obtained through coupling, to obtain a third power value. An input terminal of the second optical attenuator is connected to the first downlink port, an output terminal of the second optical attenuator is connected to the first directional coupler, and the optical signal passing through the first downlink port passes through the second optical attenuator. The second optical attenuator may further receive a second attenuation control signal, and if the third power value is greater than a third threshold, attenuate, based on the second attenuation control signal, a power of the optical signal passing through the first downlink port. With reference to the first aspect of this application, when it is detected that an optical signal is transmitted on the first downlink port, the first optical attenuator may attenuate the power of the optical signal passing through the second downlink port, thereby improving stability of optical signal transmission.

In one embodiment, the optical module further includes a first light source, a first modulator, a first switch, a first uplink port, and a second uplink port. The first light source is configured to generate a first beam. The first modulator is configured to receive a first uplink electrical signal, modulate the first beam by using the first uplink electrical signal, to obtain a first uplink optical signal, and transmit the first uplink optical signal to the first switch. The first switch is configured to receive a first control signal, and transmit the first uplink optical signal to the first uplink port or the second uplink port based on the first control signal. The first uplink port and the second uplink port are optical ports, and the first modulator needs to occupy only one electrical port of the optical module. Therefore, a quantity of optical ports can be increased, and connectivity of the optical module can be improved. The first switch transmits the first uplink optical signal to the first uplink port or the second uplink port based on the first control signal. Therefore, the first control signal may be flexibly configured to flexibly control a transmission direction of the first uplink optical signal.

In one embodiment, the first controller is further configured to send the first control signal to the first switch.

In one embodiment, the optical module further includes a wavelength division multiplexer, a second light source, a second modulator, a second switch, and a third uplink port. The second light source is configured to generate a second beam. The second modulator is configured to receive a second uplink electrical signal, modulate the second beam by using the second uplink electrical signal, to obtain a second uplink optical signal, and transmit the second uplink optical signal to the second switch. The second switch is configured to receive a second control signal, and transmit the second uplink optical signal to the first uplink port or the third uplink port based on the second control signal. If the second switch transmits the second uplink optical signal to the first uplink port based on the second control signal, the second uplink optical signal passing through the second switch passes through the wavelength division multiplexer. If the first switch transmits the first uplink optical signal to the first uplink port based on the first control signal, the first uplink optical signal passing through the first switch also passes through the wavelength division multiplexer. The wavelength division multiplexer combines the second uplink optical signal and the first uplink optical signal to obtain a third uplink optical signal, and transmits the third uplink optical signal to the first uplink port. The first controller is further configured to obtain the second control signal, and send the second control signal to the second switch.

In this application, an input terminal of the wavelength division multiplexer is connected to the first switch and the second switch, and an output terminal of the wavelength division multiplexer is connected to the first uplink port. The wavelength division multiplexer may combine two optical signals with different wavelengths onto one optical fiber for transmission. Therefore, when the second uplink optical signal and the first uplink optical signal are received by a same receiver, a quantity of ports of the receiver may be reduced.

In one embodiment, the optical module further includes a drive amplifier. The drive amplifier is connected to the first modulator, and the drive amplifier is configured to receive the first uplink electrical signal, amplify the first uplink electrical signal, and send an amplified first uplink electrical signal to the first modulator.

In one embodiment, the first controller is further configured to adjust an operating wavelength of the first modulator, so that the operating wavelength of the first modulator matches a wavelength of the first beam. First uplink optical signals with different wavelengths are obtained by changing the wavelength of the first beam, to improve adaptability of the optical module in scenarios with different wavelength requirements.

In one embodiment, the first modulator is an electro-absorption modulator. Because the first uplink optical signal may have loss when passing through the first switch, loss of the first optical signal in other aspects is expected to be reduced. When the electro-absorption modulator is used, lower loss can be achieved, and strength of an optical signal can be improved.

A second aspect of this application provides a data center system. The data center system includes a convergence layer switching device group and an access layer switching device group. The convergence layer switching device group includes one optical switching device and N electrical switching devices, where N is an integer greater than 0. The access layer switching device group includes a first device, and the first device includes the optical module according to any one of the first aspect or the embodiments of the first aspect. The first device includes N+1 downlink ports, and the N+1 downlink ports include one first downlink port and N second downlink ports. The first downlink port is connected to the optical switching device, and each second downlink port is connected to one electrical switching device. A first directional coupler is configured to receive a first downlink optical signal sent by the optical switching device.

A third aspect of this application provides a data transmission method. The method includes: receiving a first downlink optical signal passing through a first downlink port; detecting a power of an optical signal obtained through coupling from the first downlink optical signal, to obtain a first power value; and if the first power value is greater than a first threshold, attenuating, by the optical module, a power of an optical signal passing through a second downlink port, and converting, by the optical module, the first downlink optical signal into a first downlink electrical signal; or if the first power value is less than or equal to the first threshold, receiving, by the optical module, the optical signal passing through the second downlink port, and converting the optical signal passing through the second downlink port into an electrical signal. In one embodiment, an operation, for example, wavelength combination processing or electrical signal amplification, of an optional component described in a specific implementation of the first aspect may be further performed. Details are not described herein again.

A fourth aspect of this application provides an optical transmit module. The optical transmit module includes a first light source, a first modulator, a first switch, a first uplink port, and a second uplink port. The first light source is configured to generate a first beam. The first modulator is configured to receive a first uplink electrical signal, modulate the first beam by using the first uplink electrical signal, to obtain a first uplink optical signal, and transmit the first uplink optical signal to the first switch. The first switch is configured to receive a first control signal, and transmit the first uplink optical signal to the first uplink port or the second uplink port based on the first control signal.

In this application, the first uplink port and the second uplink port are optical ports, and the first modulator needs to occupy only one electrical port of the optical module. Therefore, a quantity of optical ports can be increased, and connectivity of the optical module can be improved. The first switch transmits the first uplink optical signal to the first uplink port or the second uplink port based on the first control signal. Therefore, the first control signal may be flexibly configured to flexibly control a transmission direction of the first uplink optical signal.

In one embodiment, the optical transmit module further includes a first controller, and the first controller is configured to send the first control signal to the first switch.

In one embodiment, the optical transmit module further includes a wavelength division multiplexer, a second light source, a second modulator, a second switch, and a third uplink port. The second light source is configured to generate a second beam. The second modulator is configured to receive a second uplink electrical signal, modulate the second beam by using the second uplink electrical signal, to obtain a second uplink optical signal, and transmit the second uplink optical signal to the second switch. The second switch is configured to receive a second control signal, and transmit the second uplink optical signal to the first uplink port or the third uplink port based on the second control signal. The wavelength division multiplexer is configured to receive the second uplink optical signal passing through the second switch, and is further configured to receive the first uplink optical signal passing through the first switch, combine the second uplink optical signal and the first uplink optical signal to obtain a third uplink optical signal, and transmit the third uplink optical signal to the first uplink port. The first controller is further configured to obtain the second control signal, and send the second control signal to the second switch. When the second uplink optical signal and the first uplink optical signal are received by a same receiver, a quantity of ports of the receiver may be reduced.

In one embodiment, the optical transmit module further includes a drive amplifier. The drive amplifier is connected to the first modulator, and is configured to amplify the first uplink electrical signal, and send an amplified first uplink electrical signal to the first modulator.

In one embodiment, the first controller is further configured to adjust an operating wavelength of the first modulator, so that the operating wavelength of the first modulator matches a wavelength of the first beam. The wavelength of the first beam may be flexibly changed, and a wavelength of the first uplink optical signal may also be changed as the wavelength of the first beam is changed. Therefore, first uplink optical signals with different wavelengths can be flexibly obtained through modulation, to improve adaptability of an optical module in scenarios with different wavelength requirements.

In one embodiment, the first modulator is an electro-absorption modulator.

DESCRIPTION OF EMBODIMENTS

Figure 1:
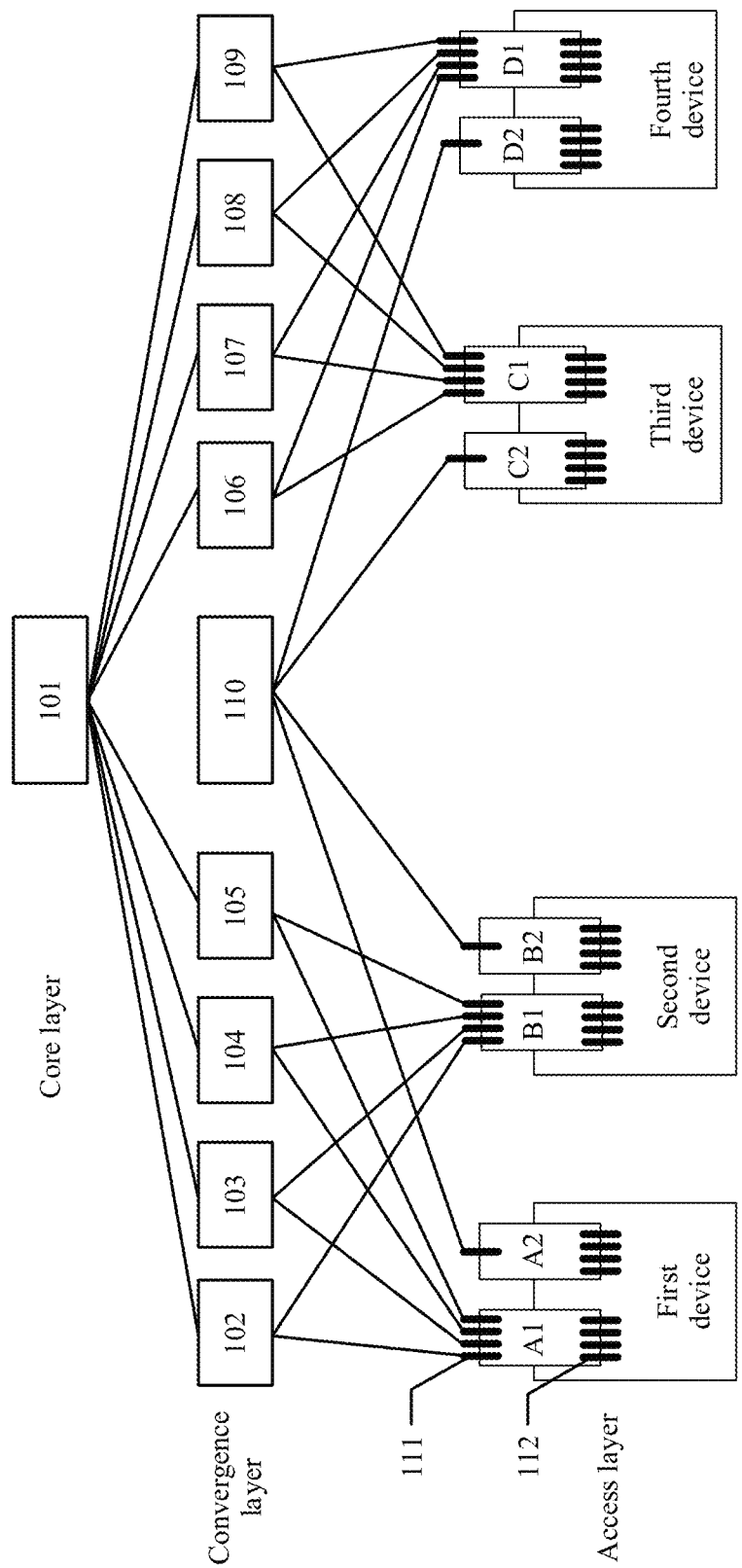
FIG. 1 is a schematic diagram of a network framework according to an embodiment of this application.

Embodiments of this application provide an optical module, a data center system, and a data transmission method that are applied to the field of optical network communication, to improve connectivity of an optical module and reduce costs of the optical module.

Optical communication is a communication mode in which a light wave serves as a carrier. With rapid development of a network, a volume of data that needs to be transmitted on the network is also increasing. Compared with electrical communication, the optical communication has a higher operating frequency, and therefore can achieve a higher transmission speed. In the optical communication, an optical fiber is usually used as a transmission medium for light waves. Therefore, the optical communication is also referred to as fiber-optic communication. In the fiber-optic communication, a transmit end needs to convert an electrical signal into an optical signal, and transmit the optical signal through an optical fiber, and a receive end converts a received optical signal into an electrical signal.

The optical module includes an optical receive module or an optical transmit module. The optical transmit module is configured to convert an electrical signal into an optical signal at a transmit end. A principle is as follows: A laser generates a beam, and a modulator modulates the beam by using an electrical signal, to make intensity, or a phase, or intensity and a phase of the beam change. The optical module may include both an optical receive module and an optical transmit module, and is also referred to as an integrated optical transceiver module. The modulator is one of basic devices of the optical communication. Common modulators include a modulator based on a free-carrier plasma dispersion effect and a modulator based on electro-absorption. Currently, there are mainly two types of modulators based on the free-carrier plasma dispersion effect: a Mach-Zehnder modulator (MZM) and a microring modulator. The modulator based on electro-absorption is an optical signal modulation device fabricated by using an electro-optic effect in a semiconductor. Usually, the electro-absorption modulator modulates a beam generated by a laser, and the electro-absorption modulator usually modulates the beam by changing intensity of the beam based on a change of an electrical signal.

A plurality of optical signals with different wavelengths may be transmitted on one optical fiber. This is a wavelength division multiplexing (WDM) technology. A wavelength division multiplexer is used in the WDM technology. At a transmit end, the wavelength division multiplexer couples a plurality of optical signals with different wavelengths to one optical fiber for transmission. After optical signals with different wavelengths are transmitted to a receive end, a demultiplexer separates the optical signals with different wavelengths, where the demultiplexer is also referred to as a beam splitter.

In the fiber-optic communication, a transmit end and a receive end are not necessarily directly connected, and there may be an intermediate network node, for example, a switching device or a router. In this case, the network node carries a signal receiving function and a signal sending function. Therefore, the network node also has an optical module, which is also referred to as an optical forwarding module. An optical module at the transmit end converts an electrical signal into an optical signal, and then transmits the optical signal to the receive end through an optical fiber. Therefore, the network node receives the optical signal. If the network node is a switching device and the network node directly forwards the optical signal to the receive end, the switching device is an optical switching device; or if the network node converts the optical signal into an electrical signal, converts the electrical signal into an optical signal, and then forwards the optical signal to the receive end, the switching device is an electrical switching device.

In this application, the optical module may be an optical transmit module, or the optical module may be an optical receive module, and structural designs of the optical transmit module and the optical receive module are different. The following separately describes two structures. For example, features or content identified by dashed lines in accompanying drawings included in embodiments of this application may be understood as optional operations or optional structures of the embodiments.

Figure 2:
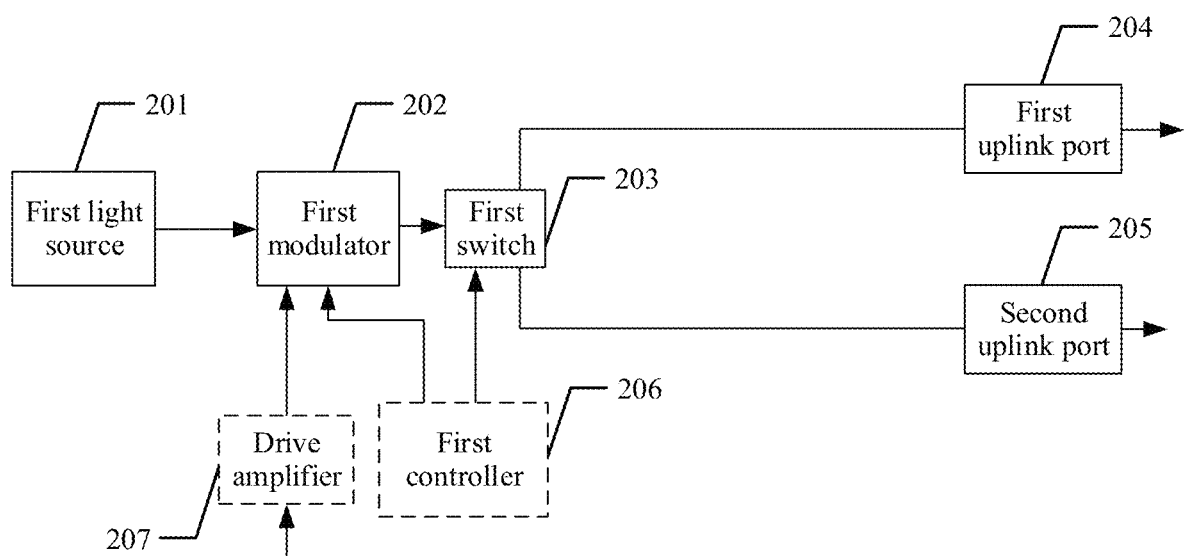
FIG. 2 is a schematic diagram of a structure of an optical transmit module in the case of a single channel according to an embodiment of this application.

FIG. 2 is a schematic diagram of a structure of an optical transmit module in the case of a single channel according to an embodiment of this application. As shown in FIG. 2, the optical module includes a first light source 201, a first modulator 202, a first switch 203, a first uplink port 204, and a second uplink port 205. The first light source 201 is configured to generate a first beam. The first modulator 202 is configured to receive a first uplink electrical signal, modulate the first beam by using the first uplink electrical signal, to obtain a first uplink optical signal, and transmit the first uplink optical signal to the first switch 203. The first switch is configured to receive a first control signal, and transmit the first uplink optical signal to the first uplink port 204 or the second uplink port 205 based on the first control signal.

The first light source 201 may be a laser, for example, a distributed feedback (DFB) laser or a Fabry-Perot (FP) laser. The FP laser mainly has two operating wavelengths: 1310 nanometers and 1550 nanometers. An operating wavelength of a laser is a center wavelength of a spectrum emitted by the laser.

The first switch 203 may include an optical splitter, a first optical waveguide, and a second optical waveguide. The optical splitter includes one input port and two output ports. After the optical splitter receives the first uplink optical signal through the input port, the optical splitter separately transmits the first uplink optical signal to the two output ports. One output port is connected to the first optical waveguide, and the other output port is connected to the second optical waveguide. The optical waveguide may allow or prevent passing of the first uplink optical signal based on the first control signal. The first control signal may be an applied voltage, and the optical waveguide may allow or prevent passing of the first uplink optical signal based on a magnitude of the voltage. The first optical waveguide is connected to the first uplink port, and the second optical waveguide is connected to the second uplink port. For example, if a voltage applied to the first optical waveguide is greater than a fourth threshold and a voltage applied to the second optical waveguide is less than a fifth threshold, a first uplink optical signal passing through the first optical waveguide is blocked, and a first uplink optical signal passing through the second optical waveguide properly passes. The first uplink port 204 does not output the first uplink optical signal. Functions of the first optical waveguide and the second optical waveguide in the first switch 203 are similar to a function of an optical attenuator. Therefore, the optical waveguide may be replaced with the optical attenuator.

Alternatively, the first switch 203 may be a Mach-Zehnder interferometer (MZI). The MZI is connected to a port a, a port c, and a port d. An optical signal input from the port a to the MZI is divided into two signals by a beam splitter 1. After being transmitted on two arms of the MZI, the two signals are output by a 2×2 directional coupler to the port c or the port d. One of the two arms of the MZI is equipped with a phase regulator, or each of the two arms is equipped with a phase regulator. The phase regulator may be based on an electro-optic or thermo-optic effect. A voltage or a temperature of the phase regulator is changed to change a phase difference between optical signals transmitted on the two arms, so that all optical signals input from the port a are output by the port c or the port d.

The first uplink port 204 and the second uplink port 205 may be optical coupling devices. An optical coupling device needs to be disposed to prevent signal interference between an optical fiber and the optical module and because of the following reason: The optical waveguide in the optical module is usually small in size, and a cross-sectional size of the optical waveguide is less than 0.5 micrometers. However, a core diameter of a common single-mode optical fiber is approximately 8 to 10 micrometers. Therefore, the optical waveguide and the optical fiber vary greatly in size. The optical coupling device may be a mode size converter or a grating coupler.

The first modulator 202 may be an MZM, a microring modulator, or an electro-absorption modulator.

In one embodiment, the optical module may further include a first controller 206, configured to send the first control signal to the first switch 203. The first controller 206 may be an application-specific integrated circuit (ASIC), a digital signal processor (DSP), or a baseband chip. Alternatively, the first controller 206 may be another chip with a processing function, for example, may be a central processing unit (CPU), a network processor (NP), a field-programmable gate array (FPGA), or any combination thereof.

In one embodiment, the first controller 206 is further configured to adjust an operating wavelength of the first modulator 202. An operating wavelength of the first light source 201 is usually an 0 band near 1310 nanometers or a C band near 1550 nanometers. When the first light source 201 uses different operating wavelengths, the first modulator 202 may also use different operating wavelengths, and the first controller 206 may adjust the operating wavelength of the first modulator 202, so that the operating wavelength of the first modulator 202 matches a wavelength of the first beam. The wavelength of the first beam is the operating wavelength of the first light source 201, and the operating wavelength of the first modulator 202 is a wavelength range. The matching means making the operating wavelength of the first modulator 202 include the wavelength of the first beam. When a same first uplink electrical signal is input, a wavelength of a first uplink optical signal output by the first modulator 202 is related to a wavelength of an input first beam, that is, the first modulator 202 has an operating wavelength. If the wavelength of the input first beam deviates from the operating wavelength, a modulation effect of the modulator is weakened, or even no modulation effect can be implemented on the first uplink electrical signal.

Therefore, the first controller 206 may further adjust the operating wavelength of the first modulator, so that the operating wavelength of the first modulator matches the wavelength of the first beam. Based on the thermo-optic effect, a temperature of an optical waveguide on an arm of the MZM or a temperature of a microring in the microring modulator is changed to change an effective refractive index of the optical waveguide, to change an operating wavelength of the MZM or the microring modulator. Specifically, a voltage loaded on the microring in the microring modulator may be changed, so that the temperature of the microring changes, and a resonance wavelength of the microring is shifted, that is, the operating wavelength of the microring modulator changes.

In one embodiment, the optical module further includes a drive amplifier 207. The drive amplifier 207 is connected to the first modulator 202, and the drive amplifier 207 is configured to receive the first uplink electrical signal, amplify the first uplink electrical signal, and send an amplified first uplink electrical signal to the first modulator 202. Because the drive amplifier 207 is disposed, a power of the first uplink electrical signal received by the optical module can be smaller.

Figure 3:
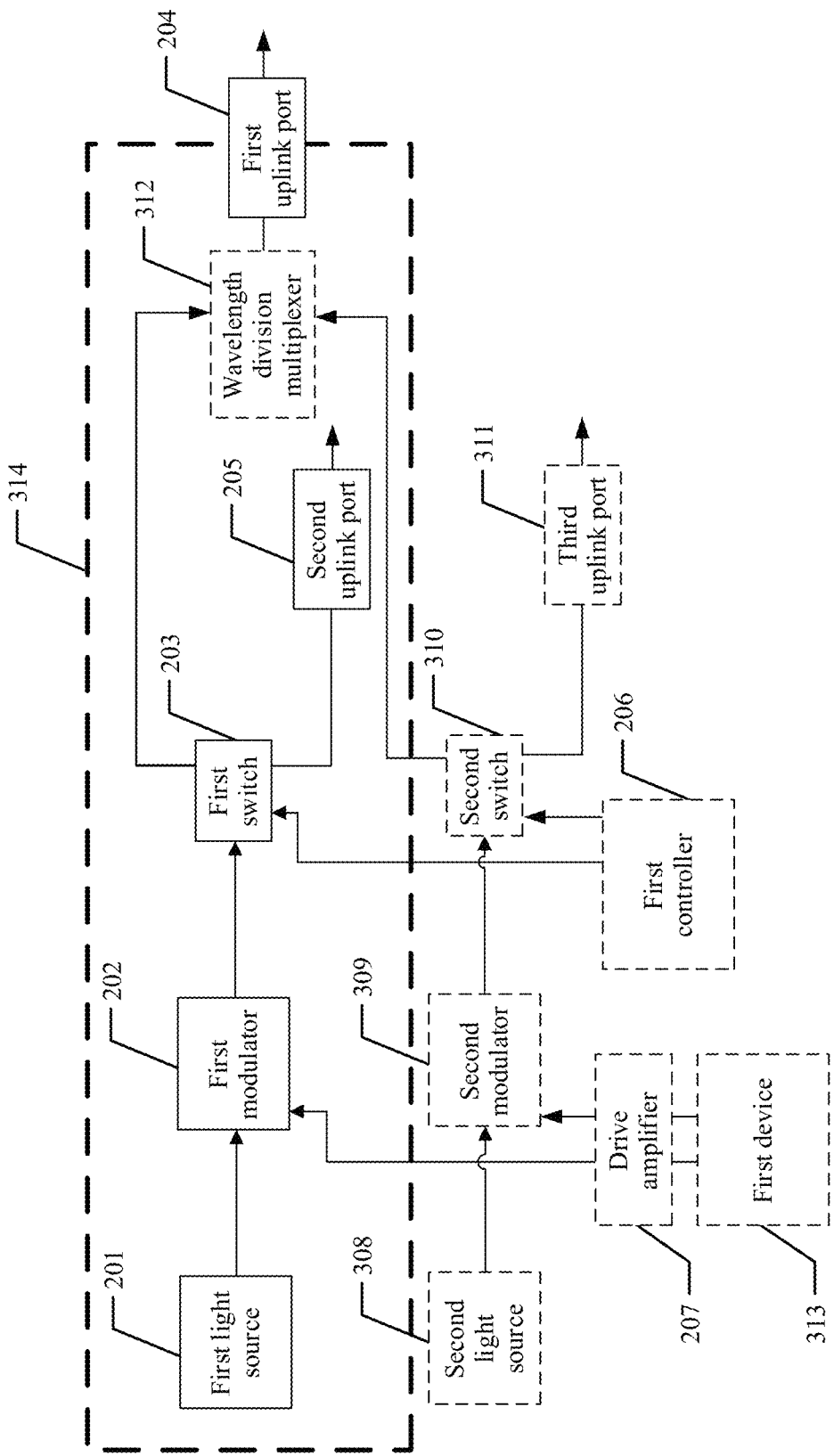
FIG. 3 is a schematic diagram of a structure of an optical transmit module in the case of two channels according to an embodiment of this application.

In one embodiment, the optical module further includes a wavelength division multiplexer 312, a second light source 308, a second modulator 309, a second switch 310, a third uplink port 311, and a first device 313. FIG. 3 is a schematic diagram of a structure of an optical transmit module in the case of two channels according to an embodiment of this application. As shown in FIG. 3, the second light source 308 is configured to generate a second beam. The second modulator 309 is configured to receive a second uplink electrical signal, modulate the second beam by using the second uplink electrical signal, to obtain a second uplink optical signal, and transmit the second uplink optical signal to the second switch 310. The second switch 310 is configured to receive a second control signal, and transmit the second uplink optical signal to the first uplink port 204 or the third uplink port 311 based on the second control signal. The wavelength division multiplexer 312 is configured to receive the second uplink optical signal passing through the second switch 310, and is further configured to receive the first uplink optical signal passing through the first switch 203, combine the second uplink optical signal and the first uplink optical signal to obtain a third uplink optical signal, and transmit the third uplink optical signal to the first uplink port 204. The first controller 206 is further configured to obtain the second control signal, and send the second control signal to the second switch 310. The first device 313 is a device connected to the optical module through an electrical port, and the first device may be a server, a router, a desktop computer, or the like. To clearly display a flow direction of a data stream, for example, the first uplink electrical signal received by the first modulator 202 and the second uplink electrical signal received by the second modulator 309 come from a same device, the first device 313 is added to FIG. 3. In actual application, when the optical module is not connected to a device, the first device 313 may not exist; or when the optical module is connected to a device, the device is the first device 313. It should be determined that the first controller 206 may be disposed inside or outside the optical module. When the first controller 206 is disposed outside the optical module, the first controller 206 may or may not belong to the first device 313. That the first controller 206 belongs to the first device 313 means that the first device 313 includes a controller, and the controller serves as the first controller 206 to implement a function that can be implemented by the first controller 206.

Descriptions of the second switch 310 are similar to those of the first switch 203, descriptions of the second modulator 309 are similar to those of the first modulator 202, and so on. For brevity of description, repeated concepts such as the second control signal and a third switch are not described below in this application, unless otherwise specified.

An input terminal of the wavelength division multiplexer 312 is connected to the first switch 203 and the second switch 310, and an output terminal of the wavelength division multiplexer 312 is connected to the first uplink port 204. The wavelength division multiplexer 312 may combine two optical signals with different wavelengths onto one optical fiber for transmission. The wavelength division multiplexer 312 may be a device integrated in the optical module, for example, a device with a multi-stage cascaded Mach-Zehnder structure, a Bragg grating directional coupler, an optical add-drop multiplexer (OADM) including a microring filter, or an arrayed waveguide grating (AWG); or may be an additional optical device, for example, a planar lightwave circuit (PLC) wavelength division multiplexer or a thin film filter (TFF).

Figure 4:
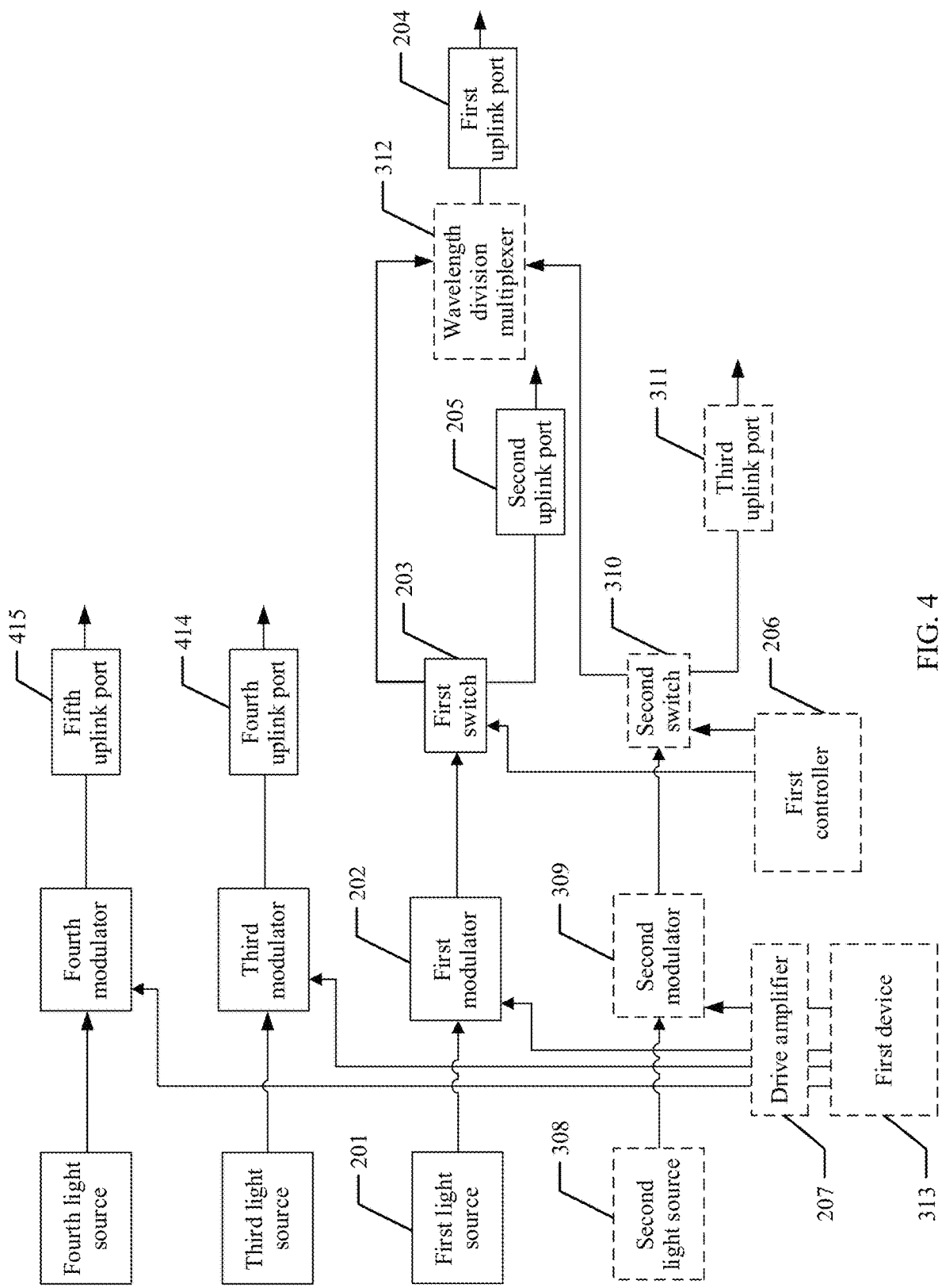
FIG. 4 is a schematic diagram of a structure of an optical transmit module in the case of four channels according to an embodiment of this application.

In one embodiment, the optical module includes a common uplink port. FIG. 4 is a schematic diagram of a structure of an optical transmit module in the case of four channels according to an embodiment of this application. As shown in FIG. 4, the common uplink port does not include ports connected in parallel, and the first uplink port 204 and the second uplink port 205 are two ports connected in parallel. Therefore, a ratio of a quantity of common uplink ports to a quantity of ports connected in parallel may be configured to flexibly configure a quantity of electrical ports connected to the first uplink port 204, namely, network bandwidth of the first uplink port 204. The optical module in FIG. 4 includes two common uplink ports: a fourth uplink port 414 and a fifth uplink port 415. The optical module further includes two pairs of ports connected in parallel: The first uplink port 204 and the second uplink port 205 are connected in parallel, and the first uplink port 204 and the third uplink port 311 are connected in parallel. Therefore, there are two electrical ports connected to the first uplink port 204. If network bandwidth that can be provided by each electrical port is 10 Gbps, the bandwidth of the first uplink port 204 is 20 Gbps. If the optical module does not include a common uplink port, four electrical ports are connected to the first uplink port 204, and the bandwidth of the first uplink port 204 may reach 40 Gbps.

Two ports share a light source and a modulator, so that the optical transmit module can improve connectivity of an optical module. In addition, the optical module structure provided in this embodiment has lower costs than a structure in a conventional technology.

Figure 5:
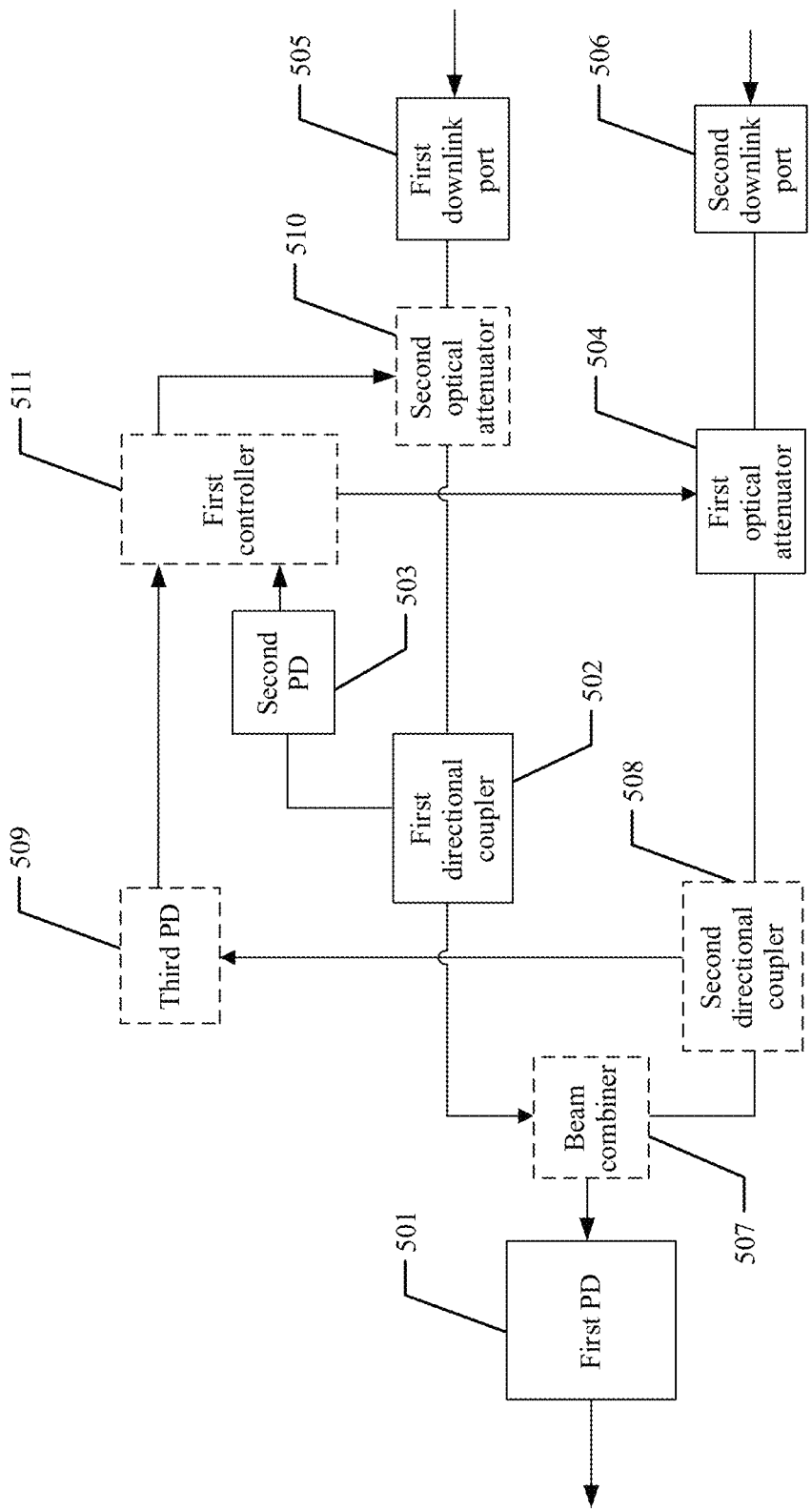
FIG. 5 is a schematic diagram of a structure of an optical receive module in the case of a single channel according to an embodiment of this application.

FIG. 5 is a schematic diagram of a structure of an optical receive module in the case of a single channel according to an embodiment of this application. As shown in FIG. 5, the optical module includes a first downlink port 505, a second downlink port 506, a first directional coupler 502, a first optical attenuator 504, a first PD 501, and a second PD 503. The first directional coupler 502 is connected to the first downlink port 505, and is configured to receive a first downlink optical signal. A first downlink optical signal passing through the first downlink port 505 passes through the first directional coupler 502. The first directional coupler 502 includes two output ports. One output port transmits the first downlink optical signal to the first PD 501, and the first PD 501 is configured to convert the first downlink optical signal into a first downlink electrical signal. The other output port transmits, to the second PD 503, an optical signal obtained through coupling from the first downlink optical signal, and the second PD 503 detects, based on the optical signal obtained through coupling, a power of the first downlink optical signal passing through the first directional coupler 502, to obtain a first power value. The first optical attenuator 504 is connected to the second downlink port 506, and an optical signal passing through the second downlink port 506 passes through the first optical attenuator 504. The first optical attenuator 504 may further receive a first attenuation control signal, and if the first power value is greater than a first threshold, attenuate, based on the first attenuation control signal, a power of the optical signal passing through the second downlink port 506. If the first optical attenuator 504 does not block the optical signal passing through the second downlink port 506, the first PD 501 may receive the optical signal passing through the second downlink port 506, and convert the optical signal into an electrical signal.

The first downlink port 505 and the second downlink port 506 may be alternatively optical coupling devices. Descriptions are similar to those of the first uplink port 204, and details are not described herein again.

The first directional coupler 502 is a directional coupler. The directional coupler is an optical device, and essentially allocates a power of an optical signal based on a specific proportion. The directional coupler includes at least one input port and two output ports. The input port is connected to one output port through a primary waveguide, the primary waveguide is coupled to a secondary waveguide, and the secondary waveguide is connected to the other output port, where the output port is also referred to as a coupling terminal. When the first downlink optical signal is input from the input port, a part of the power of the first downlink optical signal is output from the output port connected to the primary waveguide. Because the secondary waveguide is coupled to the primary waveguide, the directional coupler may couple, to the secondary waveguide, a part of a power of a first downlink optical signal transmitted on a primary line. After receiving the first downlink optical signal, the first directional coupler 502 may transmit the optical signal obtained through coupling to the second PD 503 through the coupling terminal.

The first PD 501 and the second PD 503 may be specifically a surface-illuminated PD and a waveguide PD. Like a common diode, the surface-illuminated PD is also a semiconductor device including a PN junction, and also has a unidirectional conductivity characteristic. The PD is a photoelectric sensor device that converts an optical signal into an electrical signal. When the photodiode is designed and fabricated, an area of a PN junction is made as large as possible, to receive incident light. An optical signal of the waveguide PD is transmitted to the PD through an optical waveguide. The PD also includes a part of the optical waveguide, and this part of the optical waveguide is made into a PN junction. The photodiode operates under the action of a reverse voltage. When there is no light, a reverse current is extremely weak, and is referred to as a dark current. When there is light, a reverse current rapidly increases to tens of microamperes, and is referred to as a photocurrent. Higher intensity of light leads to a larger reverse current. A change of light causes a change of a current of the photodiode. In this way, an optical signal can be converted into an electrical signal, and the photodiode becomes a photoelectric sensor device. After receiving the optical signal obtained through coupling that is transmitted by the first directional coupler 502, the second PD 503 generates currents with different magnitudes based on a magnitude of a power of the optical signal obtained through coupling, where the magnitude of the power may also be referred to as the first power value.

The first optical attenuator 504 is an optical attenuator, and the optical attenuator is a very important optical passive device. The optical attenuator may attenuate energy of an optical signal as expected. A specific implementation is to absorb or reflect a power of the optical signal. Types of the optical attenuator mainly include a displacement optical attenuator and an absorption optical attenuator. The first optical attenuator 504 is controlled by the first attenuation control signal, and the first attenuation control signal is obtained based on the first power value. If the first power value is greater than the first threshold, the first optical attenuator 504 enters an attenuation state, to attenuate the optical signal passing through the second downlink port 506.

In one embodiment, the optical module may further include a first controller 511. The first controller 511 is connected to the second PD 503, and is configured to receive the first power value sent by the second PD 503. If the first power value is greater than the first threshold, the first controller 511 may generate the first attenuation control signal, and send the first attenuation control signal to the first optical attenuator 504.

In one embodiment, the optical module may further include a beam combiner 507. An input terminal of the beam combiner 507 is connected to the first directional coupler 502 and the first optical attenuator 504, and an output terminal of the beam combiner 507 is connected to the first PD 501. The beam combiner 507 may be configured to receive the first downlink optical signal, and transmit the first downlink optical signal to the first PD 501; or the beam combiner 507 may be configured to receive the optical signal passing through the second downlink port 506, and transmit, to the first PD 501, the optical signal passing through the second downlink port 506. When the optical module does not include the beam combiner 507, the first PD 501 may include two input terminals. One input terminal is connected to the first directional coupler 502, and the other input terminal is connected to the first optical attenuator 504.

In one embodiment, the first controller 511 is further configured to obtain an attenuation stop signal, where the attenuation stop signal is obtained based on a transmission status of the first downlink electrical signal, and the transmission status is that transmission has stopped. The first controller 511 is further configured to send the attenuation stop signal to the first optical attenuator 504. The first optical attenuator 504 is further configured to stop, based on the attenuation stop signal, attenuating the power of the optical signal passing through the second downlink port 506. After converting the first downlink optical signal into the first downlink electrical signal, the first PD 501 may send the first downlink electrical signal to a device, and the device may learn of the transmission status of the first downlink electrical signal. After the device determines that transmission of the first downlink electrical signal has been completed, in other words, the transmission has stopped, if the first controller 511 belongs to the device, the device may send the attenuation stop signal to the first optical attenuator by using the first controller 511. If the first controller 511 does not belong to the device, the device may send the attenuation stop signal to the first controller 511, and then the first controller 511 sends the attenuation stop signal to the first optical attenuator 504.

In one embodiment, the second PD 503 is further configured to obtain a second power value, and send the second power value to the first controller 511. If the second power value is less than or equal to a second threshold, the first controller 511 is further configured to send an attenuation stop signal to the first optical attenuator 504. The first optical attenuator 504 is further configured to receive the attenuation stop signal, and stop, based on the attenuation stop signal, attenuating a power of a second optical signal. The second PD 503 may detect the power of the optical signal obtained through coupling from the first downlink optical signal, to obtain the second power value. If the second power value is less than or equal to the second threshold, transmission of data of the first downlink optical signal has been completed, or transmission has stopped. The first controller 511 may generate the attenuation stop signal, and send the attenuation stop signal to the first optical attenuator 504. After receiving the attenuation stop signal, the first optical attenuator 504 may stop attenuating the power of the optical signal passing through the second downlink port 506.

In one embodiment, the optical module further includes a second directional coupler 508, a second optical attenuator 510, and a third PD 509. An input terminal of the second directional coupler 508 is connected to the first optical attenuator 504, and is configured to receive the optical signal passing through the second downlink port 506. The second directional coupler 508 includes two output ports. One output port transmits, to the first PD 501, the optical signal passing through the second downlink port 506. The other output port transmits, to the third PD 509, an optical signal obtained through coupling from the optical signal passing through the second downlink port 506. The third PD 509 detects a power of the optical signal obtained through coupling, to obtain a third power value. An input terminal of the second optical attenuator 510 is connected to the first downlink port 505, and an output terminal of the second optical attenuator 510 is connected to the first directional coupler 502. The optical signal passing through the first downlink port 505 passes through the second optical attenuator 510, and the second optical attenuator 510 may further receive a second attenuation control signal, and if the third power value is greater than a third threshold, attenuate, based on the second attenuation control signal, a power of the optical signal passing through the first downlink port.

Figure 6:
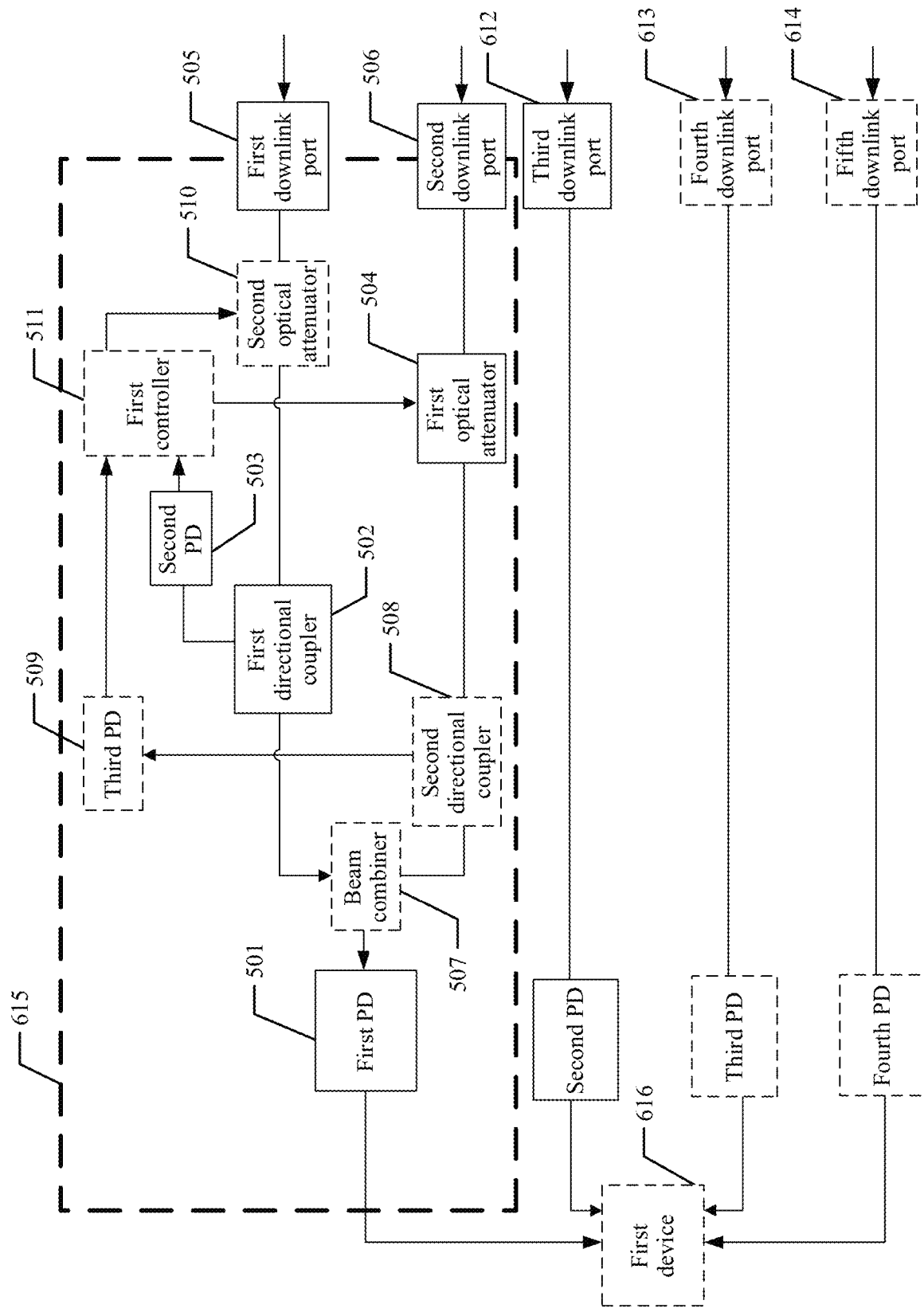
FIG. 6 is a schematic diagram of a structure of an optical receive module in the case of four channels according to an embodiment of this application.

In one embodiment, the optical module may further include a common downlink port. The common downlink port does not include ports connected in parallel. The first downlink port 505 and the second downlink port 506 share the first PD, and the first downlink port 505 and the second downlink port 506 are two ports connected in parallel. Therefore, a ratio of a quantity of common downlink ports to a quantity of downlink ports connected in parallel may be configured to flexibly configure a quantity of PDs connected to the first downlink port, namely, network bandwidth of the first downlink port 505. FIG. 6 is a schematic diagram of a structure of an optical receive module in the case of four channels according to an embodiment of this application. The optical module in FIG. 6 includes three common downlink ports: a third downlink port 612, a fourth downlink port 613, and a fifth downlink port 614. The optical module further includes a pair of ports connected in parallel: the first downlink port 505 and the second downlink port 506. Therefore, there is only one PD connected to the first downlink port 505. If network bandwidth that can be provided by each PD is 10 Gbps, the bandwidth of the first downlink port is 10 Gbps. When a quantity of PDs connected to the first downlink port is greater than 1, for example, the first PD and the second PD are included, a beam splitter may be disposed between the first downlink port and the first PD and second PD. The beam splitter splits the first downlink optical signal passing through the first downlink port into two optical signals with different wavelengths, and transmits the two optical signals to the first PD and the second PD respectively.

Two ports share one PD, so that the optical transmit module can improve connectivity of an optical module. In addition, the optical module structure provided in this embodiment has lower costs than a structure in a conventional technology.

The foregoing separately describes the cases in which the optical module is an optical transmit module or an optical receive module. It should be understood that, in actual application, the optical module may include both an optical transmit module and an optical receive module. Description is provided below by using an example.

The optical module includes both the optical transmit module 314 in FIG. 3 and the optical receive module 615 in FIG. 6. The optical transmit module 314 includes a first light source 201, a first modulator 202, a first switch 203, a first uplink port 204, and a second uplink port 205. In one embodiment, the optical transmit module 314 further includes a wavelength division multiplexer 312, a first controller 206, a first device 313, and a drive amplifier 207. The optical receive module 615 includes a first downlink port 505, a second downlink port 506, a first directional coupler 502, a first optical attenuator 504, a first PD 501, and a second PD 503. In one embodiment, the optical receive module 615 further includes a beam combiner 507, a second directional coupler 508, a third PD 509, a second optical attenuator 510, and a first device 616. The first device 616 is connected to the first PD 501, and the first device 313 is connected to the first modulator 202. The first device 616 and the first device 313 are a same device. The first controller 206 and the first controller 511 may be one controller or two controllers. It should be determined that the first controller may be disposed inside or outside the optical module. When the first controller is disposed outside the optical module, the first controller may or may not belong to the first device.

The foregoing describes the optical module, and the following describes a data center system.

Figure 7:
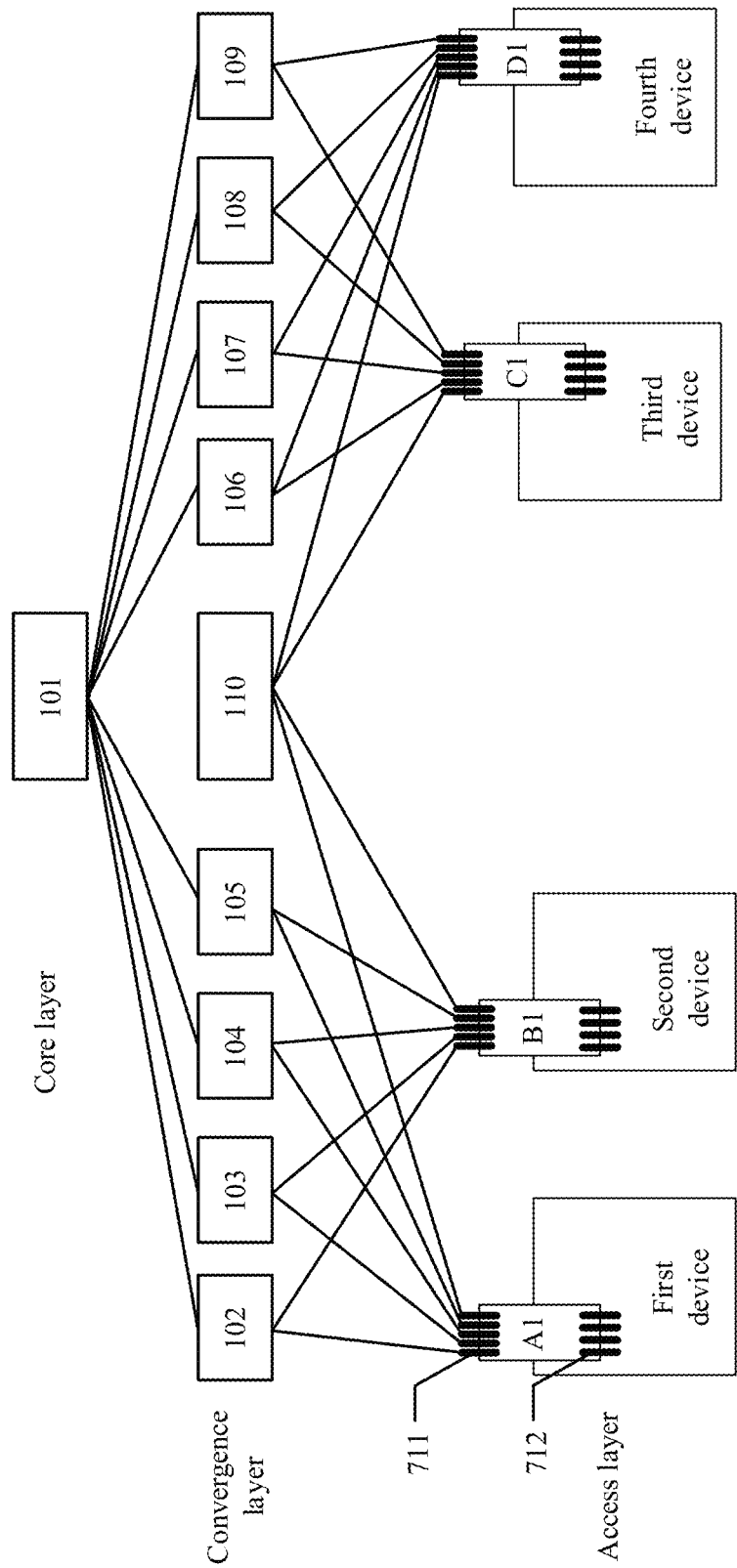
FIG. 7 is a schematic diagram of a structure of a network center system according to an embodiment of this application.

FIG. 7 is a schematic diagram of a structure of a network center system according to an embodiment of this application. As shown in FIG. 7, the data center system includes a convergence layer switching device group and an access layer switching device group. The convergence layer switching device group includes one optical switching device and N electrical switching devices, where N is an integer greater than 0. The access layer switching device group includes a first device, and the first device includes N+1 downlink ports 711. The N+1 downlink ports include one first downlink port and N second downlink ports. The first downlink port is connected to the optical switching device, and each second downlink port is connected to one electrical switching device. The first device includes the optical receive module shown in FIG. 5 or FIG. 6. The third downlink port, the fourth downlink port, and the fifth downlink port in the optical receive module are second downlink ports. The second downlink port 506 is connected to an electrical switching device 102, the third downlink port is connected to an electrical switching device 103, the fourth downlink port is connected to an electrical switching device 104, and the fifth downlink port is connected to an electrical switching device 105.

In one embodiment, the first device further includes N+1 uplink ports. The N+1 uplink ports include one first uplink port and N second uplink ports. The first uplink port is connected to the optical switching device, and each second uplink port is connected to one electrical switching device. The first device further includes the optical transmit module shown in any one of FIG. 2 to FIG. 4. The second uplink port, the third uplink port, the fourth uplink port, and the fifth uplink port in the optical transmit module are second uplink ports. The second uplink port is connected to the electrical switching device 102, the third uplink port is connected to the electrical switching device 103, the fourth uplink port is connected to the electrical switching device 104, and the fifth uplink port is connected to the electrical switching device 105.

The foregoing describes the data center system, and the following describes a data transmission method.

Figure 8:
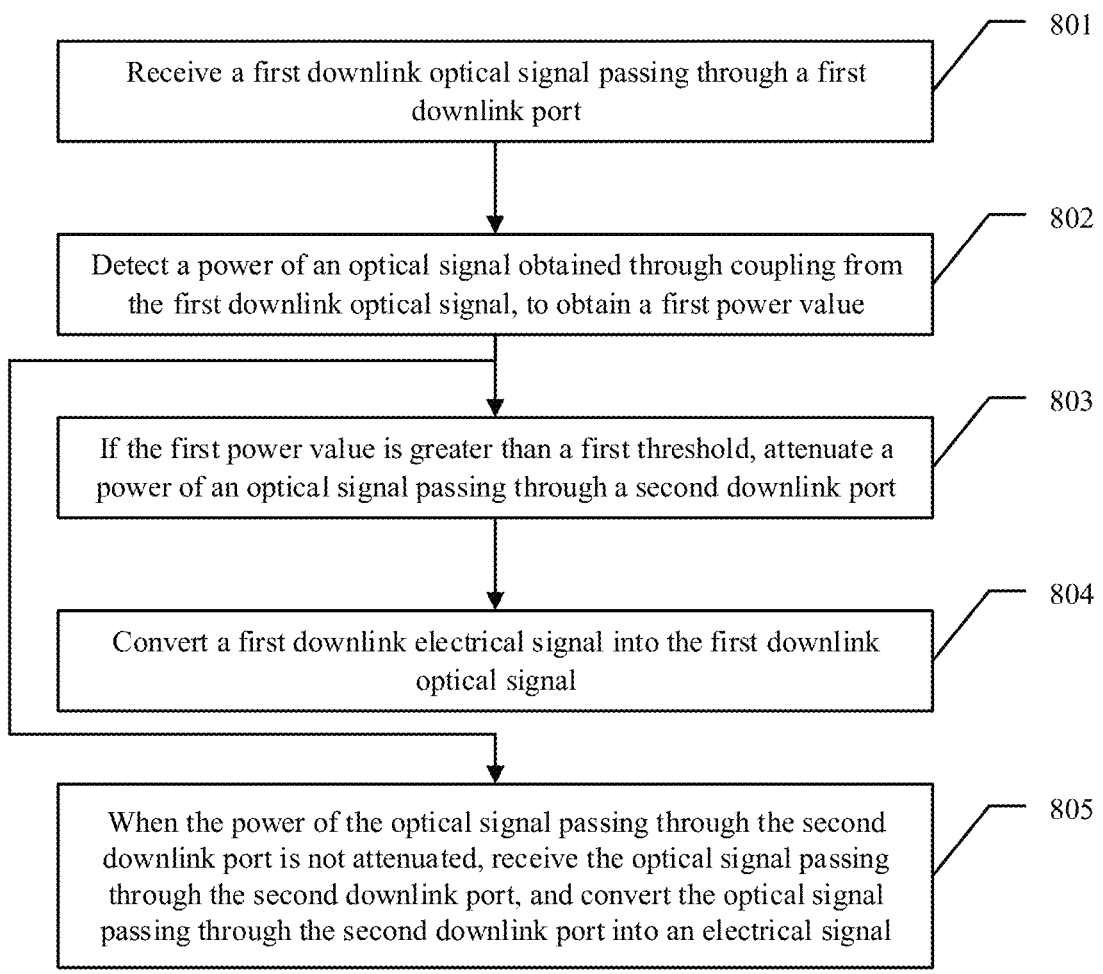
FIG. 8 is a schematic flowchart of a data transmission method according to an embodiment of this application.

FIG. 8 is a schematic flowchart of a data transmission method according to an embodiment of this application. As shown in FIG. 8, the method is performed by an optical module, and includes the following operations.

Operation 801: Receive a first downlink optical signal passing through a first downlink port.

Operation 802: Detect a power of an optical signal obtained through coupling from the first downlink optical signal, to obtain a first power value.

Operation 803: If the first power value is greater than a first threshold, attenuate a power of an optical signal passing through a second downlink port.

Operation 804: Convert a first downlink electrical signal into a first downlink optical signal.

Operation 805: When the power of the optical signal passing through the second downlink port is not attenuated, receive the optical signal passing through the second downlink port, and convert the optical signal passing through the second downlink port into an electrical signal.

In one embodiment, if the first power value is greater than the first threshold, an attenuation control signal is obtained. The optical module attenuates, based on the attenuation control signal, the power of the optical signal passing through the second downlink port.

In one embodiment, the optical module receives the first downlink optical signal by using a beam combiner. When the optical module does not attenuate the power of the optical signal passing through the second downlink port, the optical module may further receive, by using the beam combiner, the optical signal passing through the second downlink port, and convert the optical signal passing through the second downlink port into the electrical signal.

In one embodiment, the optical module receives an attenuation stop signal, where the attenuation stop signal is obtained based on a transmission status of the first downlink electrical signal, and the transmission status is that transmission has stopped. The optical module stops, based on the attenuation stop signal, attenuating the power of the optical signal passing through the second downlink port. After converting the first downlink optical signal into the first downlink electrical signal, the optical module sends the first downlink electrical signal to a device, and the device may learn of the transmission status of the first downlink electrical signal.

In one embodiment, the optical module detects a power of the optical signal passing through the first downlink port, to obtain a second power value; and if the second power value is less than or equal to a second threshold, the optical module generates the attenuation stop signal. The optical module stops, based on the attenuation stop signal, attenuating the power of the optical signal passing through the second downlink port.

In one embodiment, the optical module further detects the power of the optical signal passing through the second downlink port, to obtain a third power value; and if the third power value is greater than a third threshold, the optical module attenuates the power of the optical signal passing through the first downlink port.

In one embodiment, the optical module further generates a first beam. The optical module receives the first uplink electrical signal, and modulates the first beam by using the first uplink electrical signal to obtain the first uplink optical signal. The optical module transmits the first uplink optical signal to the first uplink port or the second uplink port based on a first control signal.

In one embodiment, the optical module may further generate a second beam; the optical module receives a second uplink electrical signal, and modulates the second beam by using the second uplink electrical signal, to obtain a second uplink optical signal; and the optical module transmits the second uplink optical signal to the first uplink port or a third uplink port based on a second control signal. If the optical module transmits the second uplink optical signal to the first uplink port based on the second control signal and the optical module transmits the first uplink optical signal to the first uplink port based on the first control signal, the optical module combines the second uplink optical signal and the first uplink optical signal to obtain a third uplink optical signal. The optical module transmits the third uplink optical signal to the first uplink port.

In one embodiment, the optical module amplifies the first uplink electrical signal by using a drive amplifier. The optical module modulates the first beam by using an amplified first uplink electrical signal, to obtain the first uplink optical signal.

In one embodiment, the optical module uses a first modulator to modulate the first beam by using the first uplink electrical signal, to obtain the first uplink optical signal. The optical module may further adjust an operating wavelength of the first modulator, so that the operating wavelength of the first modulator matches a wavelength of the first beam.

In one embodiment, the optical module uses a first modulator to modulate the first beam by using the first uplink electrical signal, to obtain the first uplink optical signal, where the first modulator is an electro-absorption modulator.

For the data transmission method in this embodiment of this application, refer to the descriptions of the optical module in FIG. 2 to FIG. 6. Details are not described herein again.

Clearly, a person skilled in the art can make various modifications and variations to embodiments of this application without departing from the scope of embodiments of this application. In this case, this application is intended to cover these modifications and variations of embodiments of this application provided that they fall within the scope of protection defined by the following claims and their equivalent technologies.

What is claimed is:

1. An optical module, comprising:
a first downlink port;
a second downlink port;
a first directional coupler connected to the first downlink port and configured to receive a first downlink optical signal;
a second photodiode (PD) connected to the first directional coupler and configured to obtain a first power value;
a first optical attenuator configured to attenuate, if the first power value is greater than a first threshold, based on a first attenuation control signal, a power of an optical signal passing through the second downlink port;
a first PD configured to convert the first downlink optical signal into a first downlink electrical signal and, if the first power value is less than or equal to the first threshold, further configured to convert the optical signal passing through the second downlink port into an electrical signal;
a second optical attenuator; and
a third PD connected to a second directional coupler and configured to obtain a third power value; and
if the third power value is greater than a third threshold, the second optical attenuator is configured to: receive a second attenuation control signal, and attenuate a power of the first downlink optical signal based on the second attenuation control signal.

2. The optical module according to claim 1, wherein the optical module further comprises a first controller, configured to receive the first power value, and if the first power value is greater than the first threshold, the first controller sends the first attenuation control signal to the first optical attenuator.

3. The optical module according to claim 1, wherein the optical module further comprises a beam combiner, configured to: receive the first downlink optical signal, and send the first downlink optical signal to the first PD; or configured to receive the optical signal passing through the second downlink port, and send the optical signal passing through the second downlink port to the first PD.

4. The optical module according to claim 2, wherein the first controller is further configured to: obtain an attenuation stop signal based on a transmission status of the first downlink electrical signal being that transmission has stopped; and send the attenuation stop signal to the first optical attenuator; and
the first optical attenuator is further configured to stop, based on the attenuation stop signal, attenuating the power of the optical signal passing through the second downlink port.

5. The optical module according to claim 2, wherein the second PD is further configured to: obtain a second power value, and send the second power value to the first controller;
if the second power value is less than or equal to a second threshold, the first controller is further configured to send an attenuation stop signal to the first optical attenuator; and
the first optical attenuator is further configured to: receive the attenuation stop signal, and stop, based on the attenuation stop signal, attenuating a power of the optical signal.

6. The optical module according to claim 1, wherein the second directional coupler is connected to the second downlink port.

7. The optical module according to claim 1, wherein the optical module further comprises a first light source, a first modulator, a first switch, a first uplink port, and a second uplink port, wherein
the first light source is configured to generate a first beam;
the first modulator is configured to: receive a first uplink electrical signal, modulate the first beam by using the first uplink electrical signal, to obtain a first uplink optical signal, and transmit the first uplink optical signal to the first switch; and
the first switch is configured to: receive a first control signal, and transmit the first uplink optical signal to the first uplink port or the second uplink port based on the first control signal.

8. The optical module according to claim 2, wherein the first controller is further configured to send the first attenuation control signal to a first switch.

9. The optical module according to claim 7, wherein the optical module further comprises a wavelength division multiplexer, a second light source, a second modulator, a second switch, and a third uplink port, wherein
the second light source is configured to generate a second beam;
the second modulator is configured to receive a second uplink electrical signal, modulate the second beam by using the second uplink electrical signal, to obtain a second uplink optical signal, and transmit the second uplink optical signal to the second switch;

the second switch is configured to: receive a second control signal, and transmit the second uplink optical signal to the first uplink port or the third uplink port based on the second control signal;

the wavelength division multiplexer is configured to: combine the second uplink optical signal passing through the second switch and the first uplink optical signal passing through the first switch to obtain a third uplink optical signal, and transmit the third uplink optical signal to the first uplink port; and a first controller is further configured to send the second control signal to the second switch.

10. The optical module according to claim 7, wherein the optical module further comprises:

a drive amplifier connected to the first modulator and configured to: amplify the first uplink electrical signal, and send an amplified first uplink electrical signal to the first modulator.

11. The optical module according to claim 7, wherein a first controller is further configured to adjust an operating wavelength of the first modulator to match a wavelength of the first beam.

12. The optical module according to claim 7, wherein the first modulator is an electro-absorption modulator.

13. A data center system, comprising:

a convergence layer switching device group comprising an optical switching device and N electrical switching devices, wherein N is an integer greater than 0;

an access layer switching device group comprising a first device, the first device comprising:

N+1 downlink ports comprising:
 a first downlink port connected to the optical switching device, and
 N second downlink ports, each of the N second downlink ports connected to one of the N electrical switching devices; and an optical module comprising:
 the first downlink port;
 a second downlink port being one of the N second downlink ports;
 a first directional coupler connected to the first downlink port and configured to receive a first downlink optical signal sent by the optical switching device;
 a second PD connected to the first directional coupler and configured to obtain a first power value;
 a first optical attenuator configured to attenuate, if the first power value is greater than a first threshold, based on a first attenuation control signal, a power of an optical signal passing through the second downlink port; and
 a first photodiode PD configured to convert the first downlink optical signal into a first downlink electrical signal, and if the first power value is less than or equal to the first threshold, further configured to convert the optical signal passing through the second downlink port into an electrical signal;
 a second optical attenuator; and
 a third PD connected to a second directional coupler and configured to obtain a third power value; and if the third power value is greater than a third threshold, the second optical attenuator is configured to: receive a second attenuation control signal, and attenuate a power of the first downlink optical signal based on the second attenuation control signal.

14. The data center system according to claim 13, wherein the optical module further comprises a first controller, configured to receive the first power value, and if the first power value is greater than the first threshold, the first controller sends the first attenuation control signal to the first optical attenuator.

15. The data center system according to claim 14, wherein the optical module further comprises a beam combiner, configured to: receive the first downlink optical signal, and send the first downlink optical signal to the first PD; or configured to receive the optical signal passing through the second downlink port, and send the optical signal passing through the second downlink port to the first PD.

16. The data center system according to claim 15, wherein the first controller is further configured to: obtain an attenuation stop signal based on a transmission status of the first downlink electrical signal being that transmission has stopped; and send the attenuation stop signal to the first optical attenuator; and the first optical attenuator is further configured to stop, based on the attenuation stop signal, attenuating the power of the optical signal passing through the second downlink port.

17. A data transmission method, comprising:

receiving a first downlink optical signal passing through a first downlink port;

detecting a power of an optical signal obtained through coupling from the first downlink optical signal, to obtain a first power value; and in repose to the first power value is greater than a first threshold, attenuating a power of an optical signal passing through a second downlink port, and converting the first downlink optical signal into a first downlink electrical signal; or in response to the first power value is less than or equal to a first threshold, receiving an optical signal passing through a second downlink port, and converting the optical signal passing through the second downlink port into an electrical signal.

18. The data transmission method according to claim 17, further comprising:

receiving an attenuation stop signal obtained based on a transmission status of the first downlink electrical signal being that transmission has stopped; and attenuating, based on the attenuation stop signal, the power of the optical signal passing through the second downlink port; or detecting a power of the optical signal passing through the first downlink port to obtain a second power value;

if the second power value is less than or equal to a second threshold, generating an attenuation stop signal; and attenuating, based on the attenuation stop signal, the power of the optical signal passing through the second downlink port.

19. The data transmission method according to claim 17, further comprising:

generating a first beam;

receiving a first uplink electrical signal;

modulating the first beam by using the first uplink electrical signal, to obtain a first uplink optical signal; and transmitting the first uplink optical signal to a first uplink port or a second uplink port based on a first control signal.

20. The data transmission method according to claim 19, further comprising:
- generating a second beam;
- receiving a second uplink electrical signal;
- modulating the second beam by using the second uplink electrical signal, to obtain a second uplink optical signal;
- transmitting the second uplink optical signal to the first uplink port or a third uplink port based on a second control signal;
- if the second uplink optical signal is transmitted to the first uplink port based on the second control signal, and the first uplink optical signal is transmitted to the first uplink port based on the first control signal, combining the second uplink optical signal and the first uplink optical signal to obtain a third uplink optical signal; and
- transmitting the third uplink optical signal to the first uplink port.

* * * * *

UNITED STATES PATENT AND TRADEMARK OFFICE
CERTIFICATE OF CORRECTION

PATENT NO. : 12,335,669 B2  
APPLICATION NO. : 17/941269  
DATED : June 17, 2025  
INVENTOR(S) : Guangcan Mi, Ruiqiang Ji and Zeshan Chang It is certified that error appears in the above-identified patent and that said Letters Patent is hereby corrected as shown below:

In the Claims

In Claim 6, Column 18, Lines 39-41, delete "The optical module according to claim 1, wherein the second directional coupler is connected to the second downlink port." and insert --The optical module according to claim 1, wherein the optical module further comprises a second directional coupler connected to the second downlink port.--.

Signed and Sealed this  
Nineteenth Day of August, 2025

Coke Morgan Stewart  
*Acting Director of the United States Patent and Trademark Office*